US012089679B2

(12) United States Patent
Blanc et al.

(10) Patent No.: US 12,089,679 B2
(45) Date of Patent: Sep. 17, 2024

(54) COSMETIC TREATMENT METHOD

(71) Applicant: L'OREAL, Paris (FR)

(72) Inventors: Jean-Baptiste Blanc, Chatenay-Malabry (FR); Franck Giron, Lagny-sur-Marne (FR); Henri Samain, Bièvres (FR); Christèle Gevrey, Sucy-en-Brie (FR)

(73) Assignee: L'OREAL, Paris (FR)

( * ) Notice: Subject to any disclaimer, the term of this patent is extended or adjusted under 35 U.S.C. 154(b) by 440 days.

(21) Appl. No.: 15/747,909

(22) PCT Filed: Jul. 26, 2016

(86) PCT No.: PCT/EP2016/067843
§ 371 (c)(1),
(2) Date: Jan. 26, 2018

(87) PCT Pub. No.: WO2017/021240
PCT Pub. Date: Feb. 9, 2017

(65) Prior Publication Data
US 2018/0206570 A1 Jul. 26, 2018

(30) Foreign Application Priority Data
Jul. 31, 2015 (FR) ..................................... 15 57360

(51) Int. Cl.
*A41G 5/02* (2006.01)
*A41G 5/00* (2006.01)
*B05B 5/16* (2006.01)

(52) U.S. Cl.
CPC ........... *A41G 5/008* (2013.01); *A41G 5/0033* (2013.01); *A41G 5/0086* (2013.01); *A41G 5/02* (2013.01); *B05B 5/1683* (2013.01)

(58) Field of Classification Search
CPC .......... A41G 5/00; A41G 5/02; A41G 5/0033; A41G 5/004; A41G 5/008; A41G 5/0086;
(Continued)

(56) References Cited

U.S. PATENT DOCUMENTS 4,135,527 A * 1/1979 Montiel ............... A45D 40/265
132/200
8,826,919 B2 * 9/2014 Dinh ........................ A41G 5/02
132/216
(Continued)

FOREIGN PATENT DOCUMENTS

EP 2311333 A1 4/2011
FR 2957760 A1 9/2011
(Continued)

OTHER PUBLICATIONS

Corresponding International application, application No. PCT/EP2016/067843 International Search Report dated Sep. 16, 2016, 3 pages.

(Continued)

*Primary Examiner* — Cris L. Rodriguez
*Assistant Examiner* — Karim Asqiriba
(74) *Attorney, Agent, or Firm* — Ronald M. Kachmarik; Cooper Legal Group LLC

(57) ABSTRACT

A cosmetic treatment method. The method includes applying an adhesive composition to human keratin materials, especially the skin. The method includes bringing fibres borne by an applicator into contact with the adhesive composition present on the keratin materials. The method includes moving the applicator away from the skin, so as to release fibres which adhere to the keratin materials, the holding force for holding the fibres on the applicator being lower than the adhesive force for adhesion of the fibres to the adhesive composition present on the keratin materials.

30 Claims, 1 Drawing Sheet

(58) Field of Classification Search

CPC ...... A41G 5/0025; A45D 19/18; A45D 19/02; A45D 2019/0066; A45D 2019/0075; A45D 2019/0083; A45D 2019/0091; A45D 2019/0033; A45D 2019/0041; A45D 2044/007; A45D 7/00; A45D 2007/001; A45D 2007/002; A61Q 5/06; A61Q 5/08; A61Q 5/10

USPC ................................ 132/201, 200, 273, 275

See application file for complete search history.

(56) References Cited

U.S. PATENT DOCUMENTS

| | | | | |
|---|---|---|---|---|
| 2007/0227550 | A1* | 10/2007 | Merszei | A41G 5/02 132/53 |
| 2007/0227551 | A1* | 10/2007 | Gold | A41G 5/0033 132/201 |
| 2010/0224126 | A1 | 9/2010 | Kriman | |
| 2011/0089268 | A1 | 4/2011 | Isaacs | |
| 2013/0152960 | A1* | 6/2013 | Pays | A41G 5/02 132/216 |
| 2013/0276807 | A1* | 10/2013 | Teater Makinen | A41G 5/008 132/201 |
| 2014/0261514 | A1 | 9/2014 | Martins et al. | |
| 2015/0114421 | A1* | 4/2015 | Pham | A41G 5/02 132/201 |
| 2015/0374099 | A1* | 12/2015 | Pires | A45D 33/36 427/463 |
| 2016/0095374 | A1* | 4/2016 | Nguyen | A41G 5/02 132/201 |
| 2016/0324241 | A2* | 11/2016 | Lee | A41G 5/02 |

FOREIGN PATENT DOCUMENTS

| | | | | |
|---|---|---|---|---|
| JP | 02200806 | A | 8/1990 | |
| JP | H04308205 | A | 10/1992 | |
| JP | 2001055611 | A | 2/2001 | |
| JP | 2002302820 | A | 10/2002 | |
| JP | 2005060863 | A | 3/2005 | |
| JP | 2007332507 | A | 12/2007 | |
| JP | 2012112090 | A | 6/2012 | |
| WO | 2003011066 | A1 | 2/2003 | |
| WO | 2004023910 | A1 | 3/2004 | |
| WO | 2004055081 | A2 | 7/2004 | |
| WO | WO-2012168894 | A1 * | 12/2012 | A45D 40/24 |
| WO | 2013015759 | A1 | 1/2013 | |
| WO | 2015091513 | A1 | 6/2015 | |

OTHER PUBLICATIONS

Corresponding Japanese Appl., Japanese Office action, Appl. No. 2018-504854, dated Apr. 1, 2019.

Corresponding Japanese Appl., Japanese Office action, Appl. No. 2018-504857, dated Apr. 1, 2019.

Corresponding Japanese Appl., Japanese Office action, Appl. No. 2018-504854, dated Apr. 13, 2020.

* cited by examiner

COSMETIC TREATMENT METHOD

BACKGROUND

The present invention relates to methods for the cosmetic treatment of human keratin materials and more particularly the skin.

Today, various techniques exist for masking or correcting alopecia:

hair implants that require surgical procedures, hairpieces or wigs,

"pepper shaker" systems that add bulk to the hairs still present in the thinning areas in order to make them more visible, colouring the skin by application of a conventional makeup or colouring product, or more invasively and permanently such as tattooing, the application of free fibres or fibres constituting a gel-type formula.

Apart from the invasive, expensive surgical procedure that is difficult to put right if it is done poorly, it is difficult to have a makeup for alopecia that is undetectable both close up and from afar, that is to say that accurately reproduces the implantation and the density of human hair.

Wigs and hairpieces have certain advantages but lead to a fear of displacement in the course of the day. Furthermore, they are thought of as a prosthesis, which has a negative and off-putting impact. Finally, they are not suitable for most alopecias, especially when the scalp is partially covered with hair. Finally, wigs and hairpieces are not suitable for short haircuts. Thus this solution does not meet with success.

Another approach consists in bonding individual fibres by electrostatic flocking. This solution consists in creating an electrostatic potential difference between a set of fibres and the area to be treated, precoated with an adhesive. The fibres are then conveyed along the field lines and are planted in the adhesive. However, such an application comes up against several difficulties, such as the need for charge-eliminating equipment, the containment of the fibres, the control of the density, the anxiety of the person with regard to the use of electricity, the compatibility of electrostatic flocking with a bathroom-type wet environment, the difficulty of self-application and the compliance with the flocking distance.

It has been attempted to deposit fibres with no electrostatic field, but the aesthetic result is unsatisfactory. In particular, if the fibres are more than one millimetre long, they tend to lie on their side, giving rise to a result that in no way resembles a head of hair. Even with a lot of skill, it is not possible to deposit a minimum number of fibres without creating this problem of lying down of the fibres.

Furthermore, it is generally accepted that the hold of an object bonded to the skin struggles to exceed two or three days. The need to perfectly correct alopecia is felt every day; thus it is advisable that this application of fibres to the skin be compatible with a daily cosmetic routine, that is to say can be carried out easily at home by self-application.

There is therefore a need, not met to date, for a method for masking alopecias in a simple manner and with a result that resembles a head of hair, so as to obtain in particular:

a density of fibres similar to the natural density, a satisfactory orientation of the fibres, bonded by a single end, a location limited to only the areas to be treated, and the possibility of treating the glabrous areas and the thinning areas.

Furthermore, this method must be able to be carried out easily and on oneself if possible.

SUMMARY

The invention aims to meet this need and achieves this by virtue of a cosmetic treatment method comprising the steps consisting in:

applying an adhesive composition to human keratin materials, especially the skin, bringing fibres borne by an applicator into contact with said adhesive composition present on said keratin materials, moving the applicator away from the skin, so as to release fibres which adhere to said keratin materials, the holding force for holding the fibres on the applicator being lower than the adhesive force for adhesion of the fibres to the adhesive composition present on said keratin materials.

The invention is for example intended to treat the hair area, the eyebrows or the beard.

An "adhesive" composition denotes any material capable of withstanding being torn off, with or without a long-lasting adhesive strength.

The system according to the invention makes it possible to create organizations of fibres with very satisfactory aesthetics.

It is possible to create several densities, ranging from low density that makes it possible to supplement or reproduce thinning heads of hair, to more dense heads of hair. It is possible to create effects of sparse beards, the appearance of which may give an especially aesthetic juvenile look. It is also possible to reproduce densities similar to natural densities (inter-hair distance of around 200 μm), the advantage of which is to make the addition of the fibres undetectable both close up and from afar. It is possible to reproduce densities greater than natural densities in order to create bushy effects or effects capable of hiding irregularities of the skin.

The density is adjusted for example by providing the fibre applicator with a greater or lesser density, corresponding to the density of fibres desired after transfer.

It is also possible to adjust the density by depositing the adhesive composition on the keratin materials without completely covering them, by making non-adhesive areas between adhesive areas. The adhesive composition is for example deposited as a network of points. By selecting the density of the adhesive areas on the keratin materials, it is possible to control the density of the fibres that remain bonded thereto after transfer.

It is also possible to act on both parameters, namely the density of the adhesive areas on the keratin materials and the density on the applicator.

In the method according to the invention, the fibres may be positioned in various ways on the applicator, depending on the desired result, and in particular the fibres may be arranged as a bundle of parallel fibres on the applicator. The fibres may be positioned on the applicator by being oriented perpendicular to the support surface or by making an angle with the normal to this surface, in particular an angle ranging up to 45°.

The applicator is preferably brought closer to said keratin materials along a direction perpendicular thereto, until the fibres contact the adhesive composition. It is preferably moved away by a reverse movement.

The adhesive force for adhesion of the fibres to the adhesive composition is preferably at least double the retaining force for retaining the fibres on the applicator. This makes it possible to guarantee that the fibres detach properly from the applicator.

The force to be exerted on the fibres in order to release them from the applicator may be less than or equal to 15 mN.

The density of the fibres on the applicator may be between 9 and 625 fibres/cm$^2$. This density is not necessary uniform and may vary in order to better reproduce a natural implantation.

The space between two adjacent fibres on the applicator is preferably between 150 and 250 microns.

The fibres may be retained on the applicator by bonding or friction or by a mechanical system comprising one or more parts that can be moved relative to one another, the latter being able to pass from a fibre-retaining configuration to a fibre-releasing configuration, the force to be exerted on these fibres in order to release them from the applicator being greater in the retaining configuration than in the releasing configuration. The mechanical system comprises for example a spring that grips the fibres between its coils, in the retaining configuration, the spring being able to be stretched in order to open the coils and release the fibres.

The fibres may be retained on the applicator by at least one material, the mechanical strength of which is degraded by a stimulus, the method comprising the step consisting in subjecting the applicator to said stimulus so as to reduce the force to be exerted on the fibres in order to release them from the applicator, the exposure to the stimulus taking place before and/or during the contact of the fibres with the adhesive composition present on said keratin materials. This solution is particularly advantageous since it enables the user to use the system without precautions while obtaining the desired make up result. A second advantage lies in the field of the production up to the delivery. The stimulus is for example thermal, said material then preferably comprising a wax, in particular beeswax, candelilla wax or paraffin wax. As a variant, the stimulus is chemical and comprises the exposure of the applicator to a solvent of said material, preferably water.

The fibres may be placed on the applicator by an electrostatic flocking method.

The fibres may detach completely from the applicator during the implementation of the method. As a variant, the fibres may comprise a root that remains trapped by the applicator and a releasable portion that is released. In this case, the fibres may comprise a predefined area that is mechanically weakened or sensitive to a stimulus that makes it possible to mechanically weaken it, in particular a thermal or chemical stimulus, the force to be exerted in order to give rise to the separation of the releasable portion from the root being lower than the adhesive force for adhesion of the releasable portion to the adhesive composition.

The predefined area may be located at the same location on the length of the fibre for all the fibres; as a variant, this is not the case, which makes it possible, after release, to have fibres of variable length, which may impart an even more natural look.

The fibres may be retained on the applicator by a multiple holding system, including a first holding system that releases the fibres for an exerted force lower than the adhesive force for adhesion of the fibres to the adhesive composition, and a second holding system that ensures, when combined with the first, the retention of the fibres up to a force greater than the adhesive force for adhesion of the fibres to the adhesive composition, the second system being modified during the use of the applicator for applying the fibres to the adhesive composition so as to bring the force to be exerted in order to give rise to the release of the fibres to a value lower than the adhesive force for adhesion of the fibres to the adhesive composition. The modification may comprise the exposure of the second holding system to a thermal or chemical stimulus.

The invention also relates to an assembly for the cosmetic treatment of human keratin materials, in particular for the implementation of the method as defined above, comprising:

- an adhesive composition to be applied to said keratin materials,
- an applicator comprising releasable fibres, the applicator making it possible to bring the fibres into contact with the adhesive composition applied to the human keratin materials, in particular the skin, to enable them to adhere to said composition, and to release fibres, the holding force for holding the fibres on the applicator being lower than the adhesive force for adhesion to the adhesive composition present on said keratin materials.

The invention also relates to an applicator for an assembly as defined above, comprising releasable fibres that detach from the applicator when a tensile force equal to 15 mN, or even equal to 20 mN, is exerted on it.

BRIEF DESCRIPTION OF THE DRAWINGS

The invention may be better understood from reading the following detailed description of non-limiting exemplary embodiments thereof and from examining the appended drawing, in which.

DETAILED DESCRIPTION

The method according to the invention is implemented with the aid of an applicator 10 that comprises a gripping portion 11 and fibres 12 which are held on the applicator in a predefined manner.

Figure 1A:
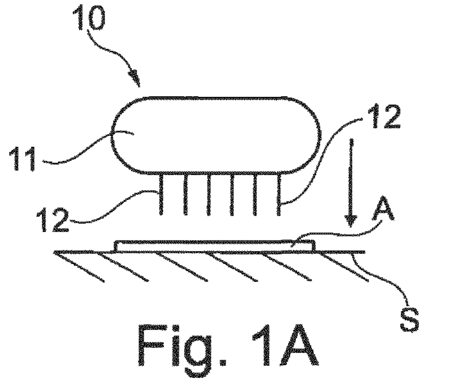
FIG. 1A illustrate illustrates an exemplary embodiment of the method according to the invention.

In FIG. 1A, such an applicator 10 has been represented schematically with a small number of fibres for reasons of clarity of the drawing, it being known that in reality, the number of fibres is much greater.

The gripping portion 11 has been represented very simply, it being understood that this may have very diverse shapes, as a function particularly of the area to be treated and of the desired ergonomics.

The applicator 10 is arranged in order to make it possible to bring the fibres 12 into contact with the region to be treated, in this case an area of skin S on which an adhesive composition A has been deposited, in a continuous or discontinuous manner.

Figure 1B:
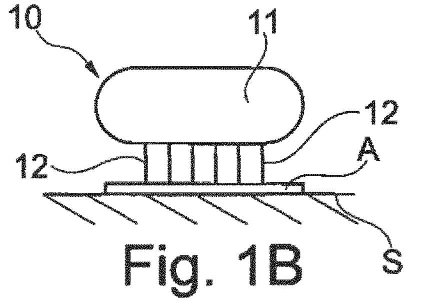
FIG. 1B illustrates an exemplary embodiment of the method according to the invention.

The fibres 12 have, on the applicator 10, one free end and when the applicator 10 is brought into contact with the skin coated with adhesive composition A, the free ends of the fibres 12 come into contact with the adhesive composition as illustrated in FIG. 1B.

The fibres 12 are retained on the applicator so that the force to be exerted in order to separate a fibre 12 from the gripping portion 11, also referred to as holding force, is lower than the adhesive force for adhesion of a fibre 12 to the adhesive composition A, that is to say the force that it is necessary to exert on this fibre in order to separate it from the adhesive composition A.

Figure 1C:
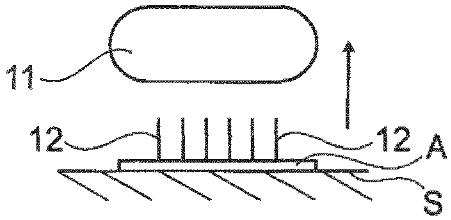
FIG. 1C illustrates an exemplary embodiment of the method according to the invention.

Illustrated in FIG. 1C is the fact that fibres are separated from the applicator 10 and remain on the skin S, with a predefined arrangement that is for example a mirror of that of the fibres 12 initially present on the applicator 10.

The amount of fibres 12 deposited by the applicator is for example from 3 $cm^2$ to $625/cm^2$.

Figure 2:
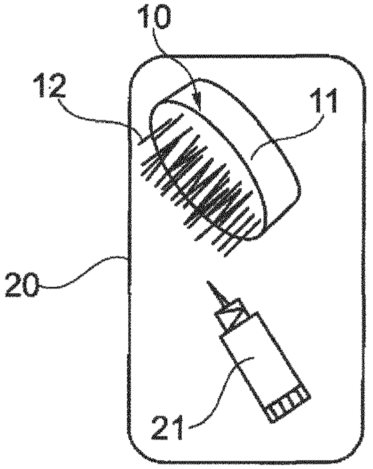
FIG. 2 represents an exemplary assembly for the implementation of the method.

As illustrated in FIG. 2, the applicator 10 and the adhesive composition A may be offered to the user within the same packaging 20, for example a box, blister pack, case or sachet, the adhesive composition A for example being contained in a receptacle 21 such as a tube or any other container, for example a bottle, pressurized receptacle, coated support, pump-dispenser bottle or pot, this list not being limiting.

In one variant, the applicator 10 and the receptacle 21 are offered separately to the consumer, in order for example to enable him or her to use the same receptacle containing the adhesive composition with several applicators 10.

The applicator 10 may, where appropriate, be refillable, that is to say comprise a gripping portion 11 which is used to carry out several treatments and a refill that bears the fibres 12, this refill being able to be removably attached to the gripping portion 11 at each new use. This refill is for example in the form of a sheet, a strip or a support arranged in order to be attached to the gripping portion, being easily replaceable, having the fibres on at least one face.

Figure 8:
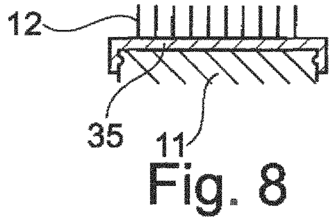
FIG. 8 represents an applicator variant in cross section.

By way of example, such a refill has been represented in FIG. 8, comprising a support 35 bearing the fibres 12, which is arranged in order to be attached to the gripping portion 11, for example by snap-fastening.

The user may be offered a range of applicators comprising fibres of different colours, nature and lengths, so as to enable him or her to select the fibres that correspond best to his or her natural colour for example.

The same gripping portion may be used with several supports bearing respective fibres of different colours.

The length of the fibres 12, after deposition on the keratin materials, is for example between 0.5 and 20 mm.

The applicator 10 may be given various shapes, in particular in order to orient the fibres 12 in a particular manner at least at the moment of contact with the region to be treated.

Figure 3:
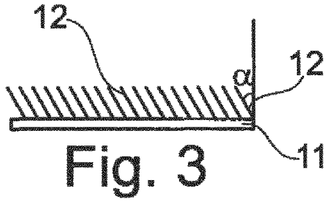
FIG. 3 illustrates an applicator variant.

It is possible to use fibres of the same nature, diameter, length, shape or colour, or fibres of different nature, length, diameter, shape or colour. The shape of the support may be a plane or a surface adapted to the morphology of the area to be treated The fibres 12 are preferably oriented perpendicularly to the support surface that bears them. As a variant, as illustrated in FIG. 3, the fibres 12 make an angle α with the normal to the support surface, which may reach 45°.

All the fibres 12 may be not in the form of a bundle of parallel fibres, as illustrated in FIGS. 1A and 1B, but in the form of a set of fibres.

The fibres may be retained in various ways on the applicator, for example with the aid of a mechanical system, which may change configuration in order to release the fibres, or a system sensitive to a stimulus, such as a thermal or chemical stimulus, that makes it possible to modify the attachment force attaching the fibres to the applicator.

Figure 4A:
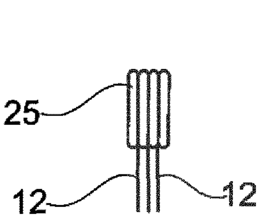
FIG. 4A represents an exemplary mechanical system for retaining the fibres on the applicator, in fibre-holding configuration.
Figure 4B:
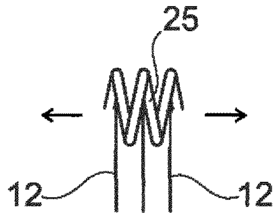
FIG. 4B represents an exemplary mechanical system for retaining the fibres on the applicator, in fibre-releasing configurations.

By way of example of a mechanical holding system, a spring 25 has been illustrated in FIG. 4A that may, when its coils are brought close together, hold the fibres 12 between them. The spring 25 may be subjected to a tension, for example via a mechanism actuated by the user, this tension causing the coils to move apart and the release of the fibres 12 previously clamped between them.

The invention is not limited to a particular system for retaining the fibres on the applicator, and rather than a spring, use may for example be made of an assembly of discs or lamellae that, when superposed and compressed, clamp the fibres.

The fibres may also be retained on the applicator by means of a material in which the fibres are implanted while the material is in the fluid state.

This is for example an elastomer that is not yet cross-linked.

The fibres are held with the desired orientation for the time that it takes for the material to set.

One way of implanting the fibres is to use electrostatic flocking.

One way of retaining the fibres on the applicator may consist in using a material to which the fibres are bonded, of which the mechanical strength, and in particular the ability to retain the fibres, may vary in response to the application of a stimulus, for example a thermal or chemical stimulus.

In the case of a thermal stimulus, use may for example be made, in order to retain the fibres 12 on the applicator 10, of a material having a relatively low melting point, such as a wax, capable of softening or liquefying in the event of a rise in temperature above ambient temperature. In this case, the applicator may comprise a heating resistor that makes it possible to locally raise the temperature of the material retaining the fibres on the applicator so as to modify its properties.

For example, the fibres 12 are held on the applicator with the aid of a wax and the applicator comprises a heating system that makes it possible to raise the temperature of the wax to a sufficient value, for example 70° C., in order to soften it and thus ensure that the adhesive force for adhesion of the fibres 12 to the adhesive composition on the skin becomes greater than the force that it is necessary to exert on the fibres 12 in order to separate them from the applicator.

In the case of a chemical stimulus, in order to retain the fibres on the applicator use is made of a material soluble in a predefined solvent, for example water, and this material is wetted before bringing the fibres 12 into contact with the adhesive composition A deposited on the skin S. The water at least partially dissolves this material and decreases the attachment force attaching the fibres thereto. This force becomes lower than the adhesive force for adhesion of the fibres 12 to the adhesive composition A deposited on the skin S and this makes it possible to release the fibres more easily after having brought the applicator 10 into contact with the region to be treated.

Figure 7:
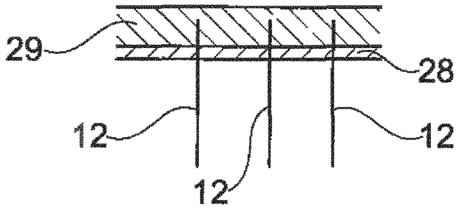
FIG. 7 illustrates a variant embodiment of the fibres and a variant attachment of the fibres to the applicator.

The material is for example soluble in water and may degrade in order to release the fibres under the action of wetting, for example being a partially or completely neutralized acrylic copolymer such as Ultrahold Strong from BASF, or a starch-based material.

Where appropriate, as illustrated in FIG. 7, the fibres are retained on the applicator with the aid of a multilayer structure comprising a first layer 28 and a second layer 29, in contact with which the roots of the fibres extend.

Together, the layers 28 and 29 retain the fibres 12 on the applicator with a retaining force that is greater than that exerted by the adhesive composition A on the fibres, so that in the absence of any other action on these layers 28 and 29, the contact of the fibres 12 with the region to be treated is not sufficient for the fibres 12 to be separated from the applicator 10.

However, one of the layers 28 and 29 is sensitive to a stimulus, for example a thermal or chemical stimulus, which makes it possible to modify the characteristics thereof and to lower its ability to retain the fibres to a value such that the retaining force for retaining the fibres 12 on the applicator is lower than that which the adhesive composition A exerts on the fibres during the application.

For example, the first system may be an elastomer that is insensitive to a solvent and the second an elastomer that is sensitive to a solvent, in particular water. In another example, the first system may be an elastomer and the second a meltable layer, in particular a layer that melts at a temperature below 70° C.

The fibres 12 may separate completely from the applicator at the time of the treatment. As a variant, the fibres 12 are produced with a particular structure that enables them to break, preferably at a predefined point of their length.

Figure 5:
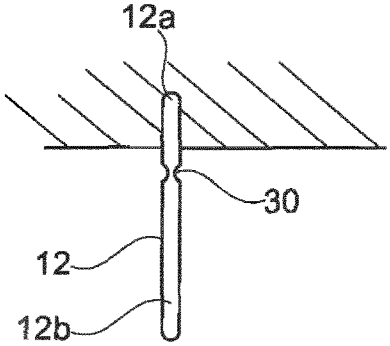
FIG. 5 illustrates a variant embodiment of the fibres and a variant attachment of the fibres to the applicator.
Figure 6:
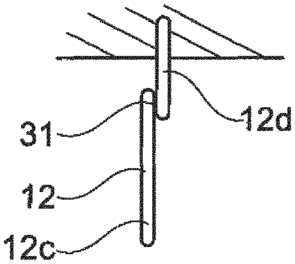
FIG. 6 illustrates a variant embodiment of the fibres and a variant attachment of the fibres to the applicator.

In the example from FIG. 5, the fibres 12 have a weakened zone 30 which extends between a base portion 12*a* of the fibre, also referred to as the root, which is anchored in the applicator 10, and a releasable portion 12*b* of the fibre, which is released during the use of the applicator.

Thus, when the free end of the releasable portion 12*b* is brought into contact with the adhesive composition A, the force that the adhesive composition exerts on the fibres 12, when the applicator 10 is moved away from the treated region, is greater than the internal cohesive force of the fibre 12 at the weakened zone 30. The fibre breaks at this weakened zone, leaving the releasable portion 12*b* of the fibre on the skin.

As a variant, rather than a breakable portion, it is possible to produce the fibres 12 by joining two portions 12*c* and 12*d* via a connection 31, for example by adhesive bonding. The strength of the connection of the two portions 12*c* and 12*d* is insufficient to withstand the force that the adhesive composition A exerts on the fibre during the use of the applicator, so that the distal portion 12*c* remains on the skin whilst the proximal portion 12*d* remains on the applicator.

It is possible to have a connection 31 the properties of which may be modified in response to a thermal or chemical stimulus; for example, the fibres are wetted before the application, which reduces the mechanical strength of the connection 31 and enables the distal portions 12*c* to remain on the skin by being separated from the proximal portions 12*d* in the connection 31 zone. The connection 31 is for example provided by a water-soluble adhesive.

Needless to say, the invention is not limited to the examples that have just been described. In particular, it is possible to produce the applicator with a mixture of fibres of different natures, lengths, shapes or cross sections, so as to render the appearance of the fibres in the treated region even more natural.

The fibres may be held on the applicator by a holding force, the value of which is reduced at the last moment before use; as a variant, this value is reduced only after the fibres have been brought into contact with the adhesive composition.

Fibres

The term "fibre" should be understood according to the invention as meaning an object of length L and of diameter D such that L is greater than D and preferably very much greater than D, D being the diameter of the circle in which the cross section of the fibre is inscribed. In particular, the ratio LID (or aspect ratio) is chosen in the range from 3.5 to 2500, preferably from 5 to 500 and better still from 5 to 150.

The fibres that can be used in the invention may be fibres of synthetic or natural, and mineral or organic, origin. They may be short or long, individual or organized, for example braided, and hollow or solid. They may have any shape and may especially have a circular or polygonal (square, hexagonal or octagonal) cross section depending on the specific application envisaged. In particular, their ends may be blunted and/or smoothed to prevent injury.

In particular, the fibres have a length ranging from 0.5 mm to 20 mm.

Their cross section may be from 20 to 120 μm, 30 to 100 μm, even better still from 40 to 80 μm.

The weight or yarn count of the fibres is often given in denier or decitex and represents the weight in grams per 9 km of yarn.

The fibres according to the invention have for example a yarn count chosen in the range from 0.1 to 100 denier, preferably from 1 to 70 denier and better still from 5 to 60 denier.

The fibres may be those used in the manufacture of textiles, and especially silk fibres, cotton fibres, wool fibres, flax fibres, cellulose fibres—especially extracted in particular from wood, from vegetables or from algae, rayon fibres, polyamide (Nylon®) fibres, viscose fibres, acetate fibres, especially rayon acetate fibres, acrylic polymer fibres, especially polymethyl methacrylate fibres or poly(2-hydroxyethyl methacrylate) fibres, polyolefin fibres and especially polyethylene or polypropylene fibres, glass fibres, silica fibres, carbon fibres, especially fibres of carbon in graphite form, polytetrafluoroethylene (such as Teflon®) fibres, insoluble collagen fibres, polyester fibres, polyvinyl chloride fibres or polyvinylidene chloride fibres, polyvinyl alcohol fibres, polyacrylonitrile fibres, chitosan fibres, polyurethane fibres, polyethylene phthalate fibres, or fibres formed from a mixture of polymers such as those mentioned above, for instance polyamide/polyester fibres.

Preferably, the fibres are polyamide-6,6 fibres.

Furthermore, the fibres may be optionally surface-treated, optionally coated with a protective layer or a layer intended to give them a colour.

Use may be made of flame-retardant acrylic fibres of "Kanekalon" brand.

The fibres are for example those sold under the reference Minke-props SKINTEX Flock ref. 590502.

It is possible to use identical fibres or as a variant a mixture of fibres that differ from one another in length, cross section, material, shape and/or cross section. The use of fibres of various lengths may impart greater naturalness. So may a mixture of colours. In particular, it may be advantageous to mix grey and white or black and white fibres.

Adhesive Composition

The adhesive composition according to the invention is suitable for application to the skin, and for cosmetic use.

The adhesive composition comprises or is constituted of an adhesive material.

For the purposes of the present invention, the term "material" means a polymer or a polymeric system that may comprise one or more polymers of different natures. This adhesive material may be in the form of a polymer solution or a dispersion of polymer particles in a solvent. This adhesive material may in addition contain a plasticizer as defined above. This adhesive material must have a certain tackiness defined by its viscoelastic properties.

The adhesive materials according to the invention may for example be chosen from adhesives of "Pressure Sensitive Adhesive" type, for instance those cited in the "Handbook of Pressure Sensitive Adhesive Technology" $3^{rd}$ edition, D. Satas.

The adhesive materials according to the invention may for example be chosen from adhesives of "Pressure Sensitive Adhesive" type, for instance those cited in the "Handbook of Pressure Sensitive Adhesive Technology" 3rd edition, D. Satas.

The pressure-sensitive adhesive materials may be chosen from acrylic polymers, especially copolymers of acrylate and methacrylate, pressure-sensitive adhesives based on rubber or based on styrene copolymers, for example such as styrene-isoprene-styrene (SIS) and styrene-butadiene-styrene (SBS) copolymers.

They may also be urethane polymers, polyurethanes, silicones, such as Bio-PSAs, ethylene/vinyl acetate polymers, block copolymers based on styrene or natural rubbers, chloroprene, butadiene, isoprene, neoprene or the like.

As nonlimiting examples of pressure-sensitive adhesives based on rubbery polymers, mention may in particular be made of natural rubber (poly(cis-1,4-isoprene)), methyl methacrylate-isoprene graft copolymers, styrene-butadiene copolymers, butyl rubber, acrylonitrile-butadiene rubber, styrene-isoprene block copolymers, polybutadiene, ethylene-butylene block copolymers and polychloroprene.

Among the pressure-sensitive adhesives comprising polar acrylic polymers, mention may be made of block or statistical copolymers based on acrylic acid, alkyl acrylates and alkyl methacrylates, and also the copolymers of these acrylics with ethylene and vinyl acetate.

As other pressure-sensitive adhesives, mention may be made of copolymers of butyl acrylate, butyl methacrylate and acrylic acid, these copolymers being available commercially, for example under the brand RODERM 560 (Rohm and Haas).

An example of a pressure-sensitive adhesive that may be very partially suitable is poly(2-ethylhexyl acrylate), for example the one available commercially under the brand GEL-TAC 100G (Advanced Polymer International), as an aqueous dispersion containing 40% solids of 15 micron adhesive acrylic microspheres.

Examples of acrylic copolymers that may be suitable are available commercially under the brands EASTAREZ 2010, 2020 and 2050 (Eastman Chemical Co.). ACRONAL V210 (BASF), MOWILITH LDM 7255, REVACRYL 491 (Clariant) and FLEXBOND 165 (Air Products).

Commercial examples of polymeric rubbers that may be suitable are known under the brands RICON 130 polybutadiene (Atofina Sartomer) and ISOLENE 40 polyisoprene (Elementis).

Examples of polyurethane-based adhesives that may be suitable are available under the brands SANCURE 2104 (Novéon) and VYLON UR 1400 (Toyobo Vylon).

Examples of vinyl acetate copolymers that may be suitable are available commercially under the brands PVP/VA 6-630 (International Specialty Products) and FLEXBOND 149 (Air Products).

Examples of vinyl alcohol/vinyl acetate copolymers are available commercially under the brands CELVOL 107 (Celanese) and ELVANOL 50-42 (DuPont).

Mention may also be made of the block or statistical copolymers comprising at least one monomer or a combination of monomers whose resulting polymer has a glass transition temperature lower than ambient temperature (25° C.), these monomers or combinations of monomers possibly being chosen from butadiene, ethylene, propylene, isoprene, isobutylene, a silicone, and mixtures thereof. Examples of such materials are block polymers of the styrene-butadiene-styrene, styrene-(ethylene-butylene)-styrene or styrene-isoprene-styrene type, for instance those sold under the trade names "Kraton" from Kraton or "Vector" from Dexco Polymers.

The adhesive materials according to the invention may also comprise tackifying resins, such as rosins or rosin derivatives such as hydrogenated rosins, rosin esters, hydrogenated rosin esters, terpenes, aliphatic or aromatic hydrocarbon-based resins, phenolic resins, styrene resins and coumarone-indene resins. Mention will also be made of the compounds such as shellac, sandarac gum, dammar resins, elemi gum, copal resins, benzoin, and gum mastic.

Mention may also be made of:

silicone resins, which are crosslinked polyorganosiloxane polymers.

The nomenclature of silicone resins is known under the name "MDTQ", the resin being described as a function of the various siloxane monomer units it comprises, each of the letters M, D, T and Q characterizing a type of unit.

Among these resins, mention may in particular be made of the siloxysilicate resins, which may be trimethyl siloxysilicates of formula $[(CH_3)_3XSiXO]_xX(SiO_{4/2})_y$ (MQ units) in which x and y are integers ranging from 50 to 80, the lipodispersible film-forming polymers in the form of non-aqueous dispersions of polymer particles, also known as NADs Use may be made, as non-aqueous dispersion of hydrophobic film-forming polymer, of dispersions of particles of a grafted ethylenic polymer, preferably an acrylic polymer, in a liquid oily phase for example, in the form of surface-stabilized particles dispersed in the liquid fatty phase.

The dispersion of surface-stabilized polymer particles can be manufactured as described in the document WO 04/055081.

Mention may also be made of dispersions of $C_1$-$C_4$ alkyl (meth)acrylate polymer particles; stabilized by a stabilizing agent chosen from isobornyl (meth)acrylate polymers, as described in document WO 2015/091513.

Use may also be made of UV-reactive adhesives.

In examples, use is made of the Pros-Aide (acrylic latex) Cream Blend 331 Adhesive, or the AQ1350 Eastman Chemical (sulfopolyester soluble polymer) adhesive.

Application of the Adhesive

The adhesive can be applied as a continuous film, especially when the density of the fibres on applicator is not too high.

As a variant, the adhesive is applied by making non-adhesive areas between the adhesive areas, which offers control over the density and the distribution of the fibres that remain attached to the keratin materials.

This makes it possible to reduce the amount of fibres that transfer, and to obtain a more natural result, especially when the density of fibres on the applicator is high.

When the adhesive areas are not connected, it is possible to have two adjacent adhesive areas separated from one another by a distance (measured from edge to edge) ranging from 30 microns to 3 mm, better still from 100 microns to 1 mm.

The size of the spaces between two adjacent adhesive areas, separated by a non-adhesive area, ranges for example from 30 μm to 3 mm, better still from 100 μm to 1 mm.

The adhesive areas may be in the form of a network, preferably a network of points, in particular a network of points from 30 microns to 3 mm in diameter. As a variant, the adhesive areas are in the form of a network of lines, or a network of lines and points, or a grid pattern. The network may be regular or irregular. An irregular network, in particular a random or pseudo-random network, is advantageous in that it makes it possible to impart a more natural appearance. In the case of a network of points, the points may be of any shape, for example circular or non-circular. All the points of the network may be of the same shape, or as a variant within the network the shape and/or the size of the points changes, for example with a variation in size or shape as a function of the location within the network.

Preferably, the shape of the points is circular.

Also preferably, the network is irregular, with a non-constant spacing between two adjacent points.

The adhesive areas may be formed by any suitable means, for example being formed with the aid of an adhesive applicator arranged to deposit the adhesive on the skin at locations separated from one another.

The adhesive areas may be formed with the aid of a dispenser comprising at least one dispensing nozzle provided with a dispensing orifice through which the adhesive is dispensed.

Use may be made of an applicator that transfers the adhesive by stamping.

In a variant, the adhesive is applied with the aid of a stencil. The adhesive may be applied by spraying, in particular through the above stencil.

The adhesive may be applied by bonding one or more adhesive articles to the skin, especially in the form of dots. In particular, the dots may be constituted of a double-sided adhesive film, coated on both sides with a removable protective film. The double-sided adhesive film is pre-cut into dots.

The density of the adhesive areas ranges for example from 4 to 700 per $cm^2$, better still between 10 and 50 per $cm^2$, even better still between 20 and 30 per $cm^2$.

EXAMPLE

An applicator is produced that comprises a set of fibres held by one end and free at the other end. The held end is characterized by the fact that the fibres withstand detachment up to a force F1. The area to be treated is coated with an adhesive composition, chosen so that it can produce a fibre-holding force, when it is brought into contact with the fibres, that is sufficient to withstand detachment up to a force F2, such that F2 is greater than 1.5F1. Typically the forces F1 and F2 are respectively of the order of 1 and 2 g. It is preferred that the force F2 be 2 times greater than F1 in the seconds that follow the fibres being brought into contact with the adhesive composition.

In order to produce the applicator, a bed of elastomer is formed with Silflo (NOMADERM ref: GOSILFLO) having a thickness of 0.050 mm on an application support. Before the Silflo has cured, fibres are flocked onto the support with the aid of an electrostatic flocking method, carried out by a manual flocking device such as the Microflocker from Campbell Coutts Ltd. The fibres are retained by friction in the Silflo.

The fibres used to produce the system are PA-6,6 fibres pretreated in order to be compatible with the electrostatic flocking method, such as Minke-props (SKINTEX Flock ref.5905 02) fibres.

In order to carry out the flocking, the electrostatic field applied between the fibres and the support is for example −35 kV.

After several minutes, the Silfo has cured and maintains the organization of the fibres.

A film of adhesive of PROS-AIDE Cream Blend 331 Adhesive type is then applied to the skin.

After several minutes, the film reaches its maximum tack. At this precise moment, the free end of the fibres is brought into contact with the adhesive. The application surface is then moved away from the adhesive. The fibres brought into contact with the adhesive remain implanted on the latter.

The invention claimed is:

1. A cosmetic treatment method comprising:

applying an adhesive composition to human keratin materials, providing fibers that are parallel from each other in a predefined direction that is the same direction for all the fibers, the fibers being bonded on an applicator each by a bonded end and having each an end opposed from the bonded end that is free from the applicator, after the fibers being provided, bringing at least some of the free ends of said fibers into contact with said adhesive composition present on said keratin materials, moving the applicator away from the keratin materials, so as to release from the applicator the bonded ends of said fibers thanks to their adhesion to said keratin materials by their free ends, a holding force for holding the bonded end of said fibers on the applicator being lower than an adhesive force for adhesion of the free ends of said fibers to the adhesive composition present on said keratin materials.

2. The method according to claim 1, the fibers being arranged on the applicator with a non-zero angle with normal to a support surface, the angle ranging from 0 to 45°.

3. The method according to claim 1, the applicator being brought closer to said keratin materials along a direction perpendicular thereto, until the fibers contact the adhesive composition.

4. The method according to claim 1, the adhesive force for adhesion of the fibers to the adhesive composition being at least double the holding force for retaining the fibers on the applicator.

5. The method according to claim 1, a density of the fibers on the applicator being between 9 and 625 fibers/$cm^2$.

6. The method according to claim 1, a space between two adjacent fibers on the applicator being between 150 and 250 microns.

7. The method according to claim 1, a density of fibers being uniform on the applicator.

8. The method according to claim 1, a density of fibers being non-uniform on the applicator.

9. The method according to claim 1, a force to be exerted on the fibers in order to release them from the applicator being less than or equal to 20 mN, or even less than or equal to 15 mN.

10. The method according to claim 1, the fibers being retained by bonding or by friction on the applicator.

11. The method according to claim 1, the fibers being retained by a mechanical system on the applicator, this mechanical system being able to pass from a fiber-retaining configuration to a fiber-releasing configuration, a force to be exerted on these fibers in order to release them from the applicator being greater in the retaining configuration than in the releasing configuration.

12. The method according to claim 11, the mechanical system comprising a spring that grips the latter between its coils in the retaining configuration, the spring being able to be stretched in order to open the coils and release the fibers.

13. The method according to claim 1, the fibers being retained on the applicator by a material a mechanical strength of which is degraded by a stimulus, the method comprising subjecting the applicator to said stimulus so as to reduce the force to be exerted on the fibers in order to release them from the applicator, an exposure to the stimulus taking place before and/or during the contact of the fibers with the adhesive composition present on said keratin materials.

14. The method according to claim 13, the stimulus being thermal.

15. The method according to claim 14, said material comprising a wax.

16. The method according to claim 13, the stimulus comprising exposure to a solvent of said material.

17. The method according to claim 1, the fibers being placed on the applicator by an electrostatic flocking method.

18. The method according to claim 1, the fibers comprising a root that remains trapped by the applicator and a releasable portion.

19. The method according to claim 18, the fibers comprising a zone that is mechanically weakened or sensitive to a stimulus that makes it possible to mechanically weaken it, a force to be exerted in order to give rise to the separation of a releasable portion of a fiber from the root being lower than the adhesive force for adhesion of the releasable portion to the adhesive composition.

20. The method according to claim 1, the fibers being retained on the applicator by a multiple holding system, including a first holding system that releases the fibers for an exerted force lower than the adhesive force for adhesion of the fibers to the adhesive composition, and a second holding system that ensures, when combined with the first, the retention of the fibers up to a tensile force greater than the adhesive force for adhesion of the fibers to the adhesive composition, the second holding system being modified during usage of the applicator for applying the fibers to the adhesive composition so as to reduce a force to be exerted in order to give rise to the release of the fibers at a value lower than the adhesive force for adhesion of the fibers to the adhesive composition.

21. The method according to claim 1, the adhesive composition being applied to the keratin materials as a continuous film.

22. The method according to claim 1, the adhesive composition being applied to the keratin materials as a discontinuous film.

23. An assembly for the cosmetic treatment of human keratin materials, for an implementation of the method as defined in claim 1, comprising:

the adhesive composition to be applied to said keratin materials, the applicator comprising releasable fibers, the applicator making it possible to bring the fibers into contact with the adhesive composition applied to the human keratin materials, to enable them to adhere to said composition, and to release fibers, the holding force for holding the fibers on the applicator being lower than the adhesive force for adhesion to the adhesive composition present on said keratin materials.

24. The assembly for the cosmetic treatment of human keratin materials as defined in claim 23, wherein the applicator comprises releasable fibers that detach from the applicator when a tensile force equal to 15 mN, or even equal to 20 mN, is exerted on it.

25. An assembly for the cosmetic treatment of human keratin materials, for an implementation of the method as defined in claim 1, comprising:

the adhesive composition to be applied to said keratin materials, the applicator comprising releasable fibers, the applicator making it possible to bring the fibers into contact with the adhesive composition applied to the human keratin materials, to enable them to adhere to said composition, and to release fibers, the holding force for holding the fibers on the applicator being lower than the fibers adhesive force for adhesion to the adhesive composition present on said keratin materials, the applicator comprising a gripping portion which is used to carry out several treatments and a refill that bears the fibers, the refill being able to be removably attached to the gripping portion at each new use.

26. The assembly according to claim 25, wherein the refill is in a form of a sheet, a strip or a support arranged in order to be attached to the gripping portion, being easily replaceable, having the fibers on at least one face.

27. The assembly according to claim 25, wherein the refill is arranged in order to be attached to the gripping portion by snap-fastening.

28. The method according to claim 1, all of said fibers held by the applicator being arranged as a bundle of parallel fibers on the applicator.

29. A cosmetic treatment method comprising:

applying an adhesive composition to human keratin materials, bringing fibers borne by an applicator into contact with said adhesive composition present on said keratin materials, moving the applicator away from the keratin materials, so as to release fibers which adhere to said keratin materials, a holding force for holding the fibers on the applicator being lower than an adhesive force for adhesion of the fibers to the adhesive composition present on said keratin materials, the fibers being retained by a mechanical system on the applicator, this mechanical system being able to pass from a fiber-retaining configuration to a fiber-releasing configuration, a force to be exerted on these fibers in order to release them from the applicator being greater in the retaining configuration than in the releasing configuration, the mechanical system comprising a spring that grips the fibers between its coils in the retaining configuration, the spring being able to be stretched in order to open the coils and release the fibers.

30. A cosmetic treatment method comprising:

placing fibers on an applicator by an electrostatic flocking method, each of said fibers having a bonded end bonded on the applicator and a free end opposed from the bonded end, applying an adhesive composition to human keratin materials, bringing at least some of the free ends of said fibers into contact with said adhesive composition present on said keratin materials, moving the applicator away from the keratin materials, so as to release from the applicator the bonded ends of said fibers which adhere to said keratin materials by their free ends, a holding force for holding the bonded end of said fibers on the applicator being lower than an adhesive force for adhesion of the free ends of said fibers to the adhesive composition present on said keratin materials.

* * * * *